United States Patent Office 3,255,800
Patented June 14, 1966

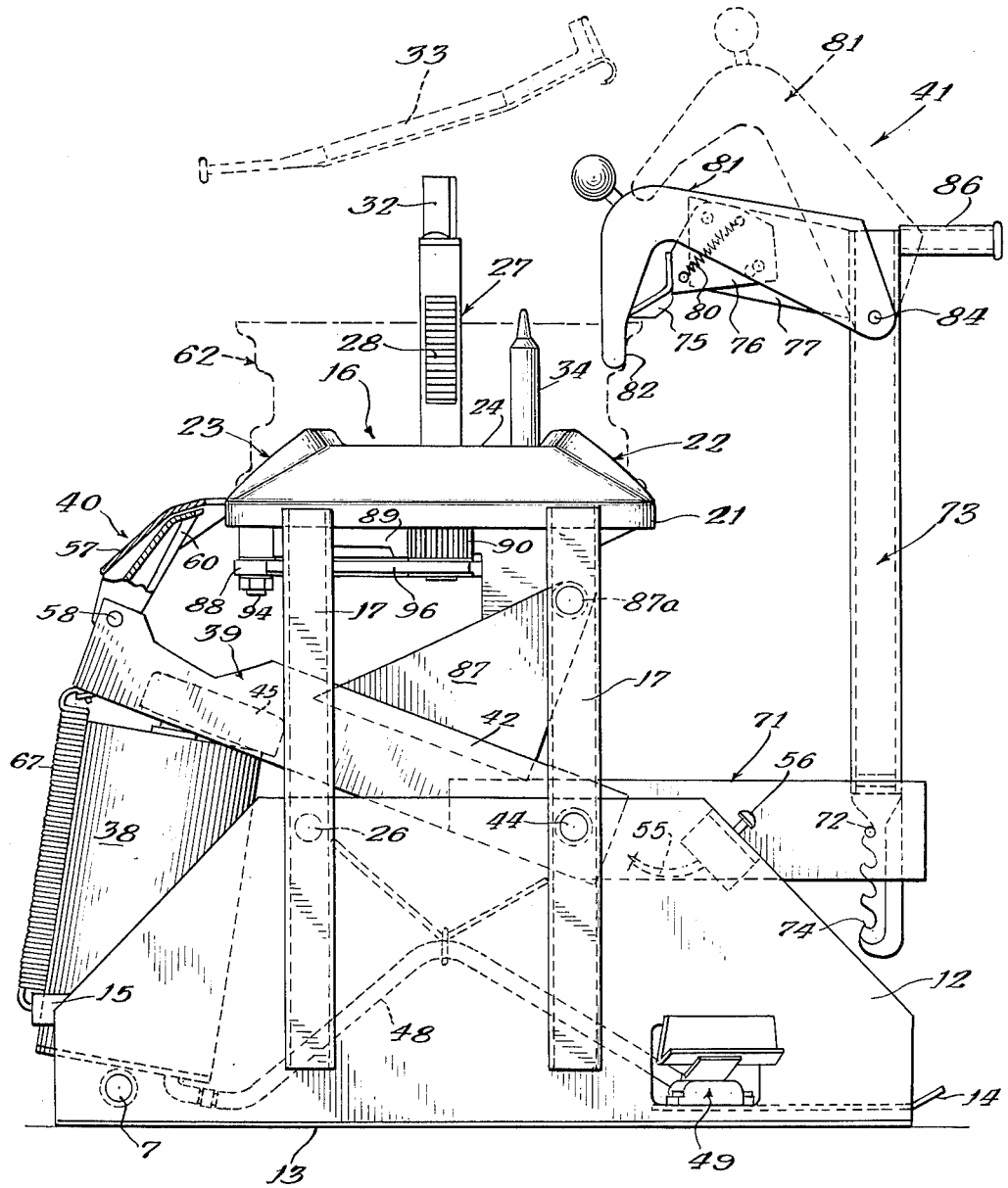

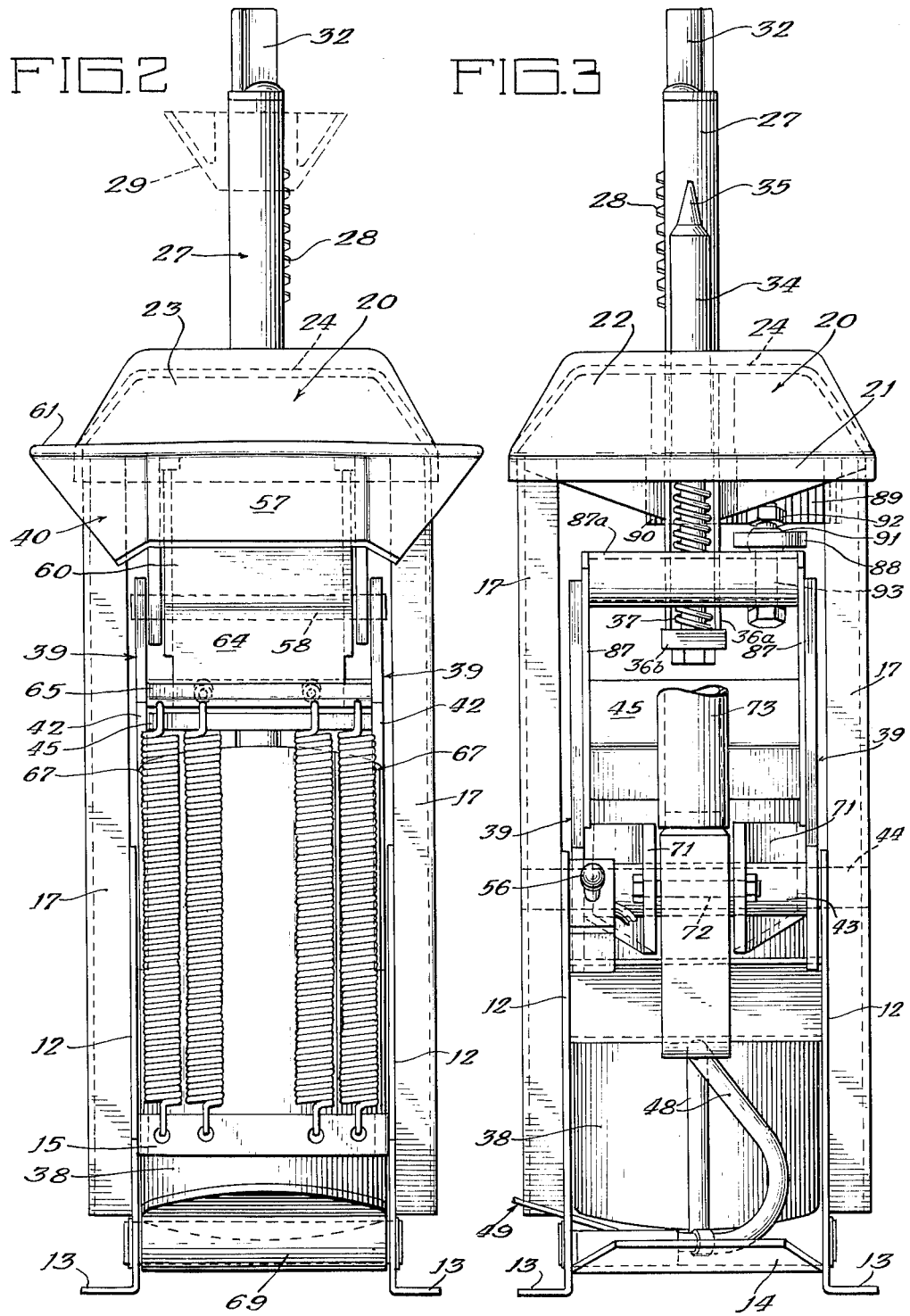

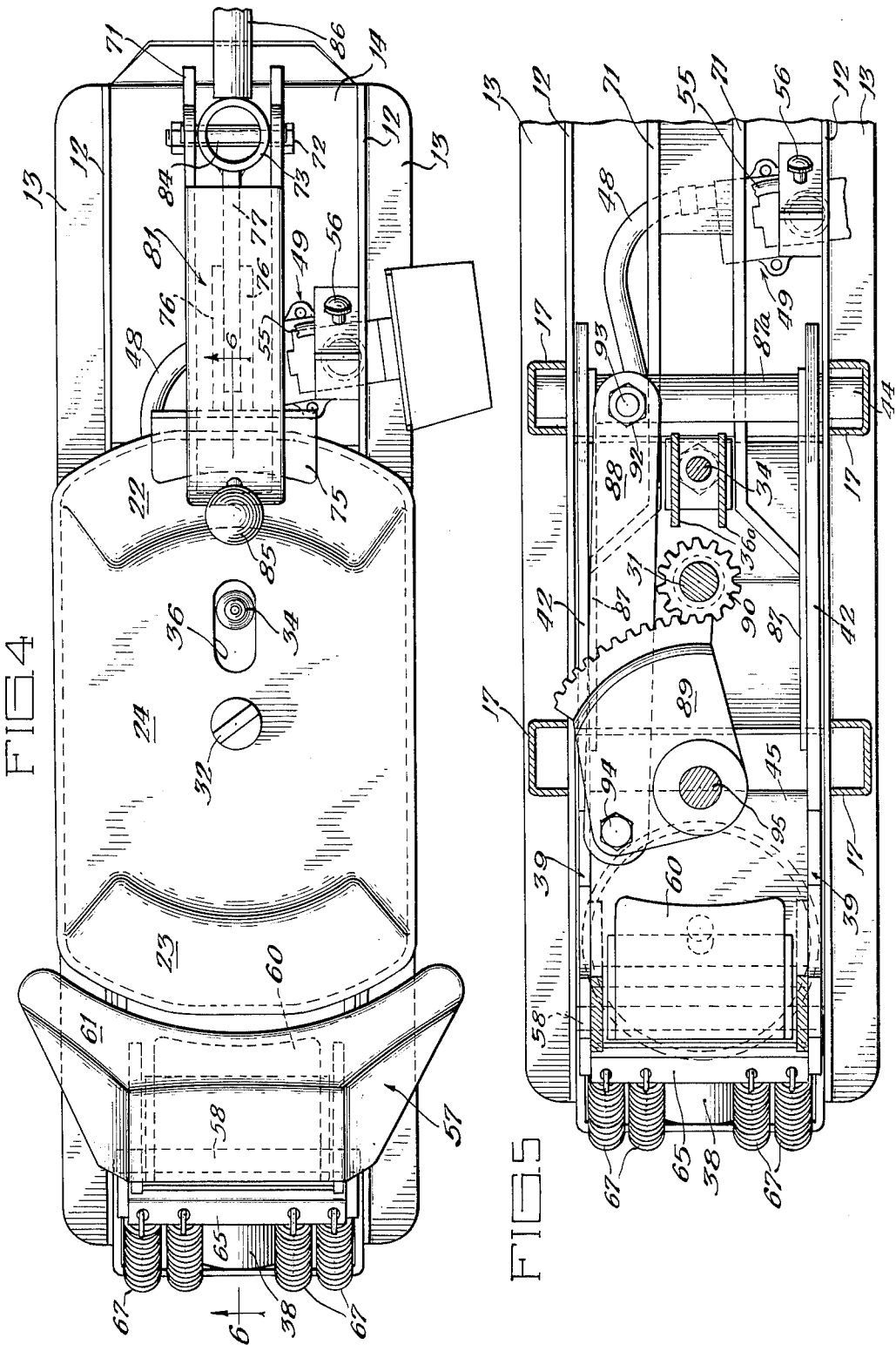

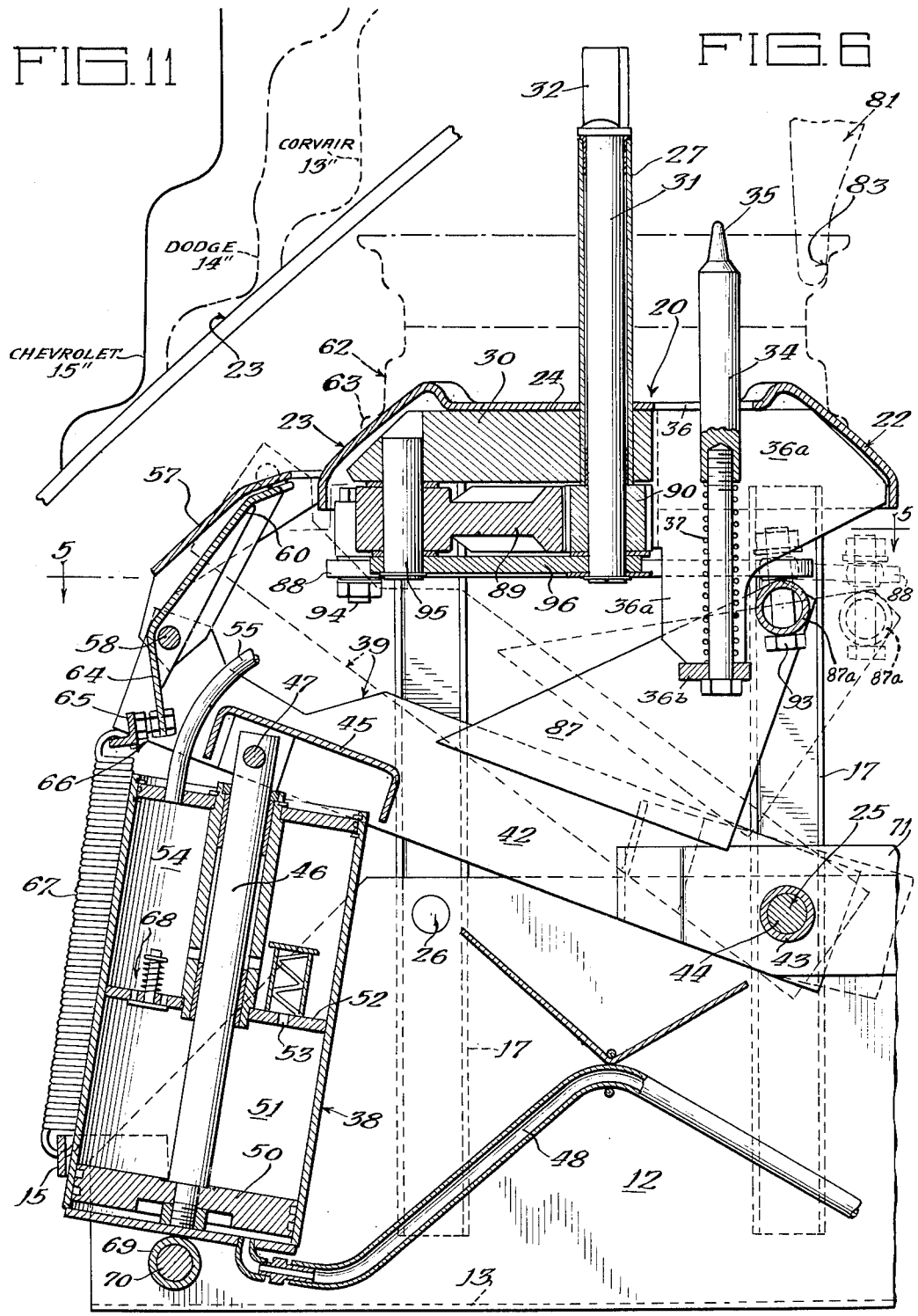

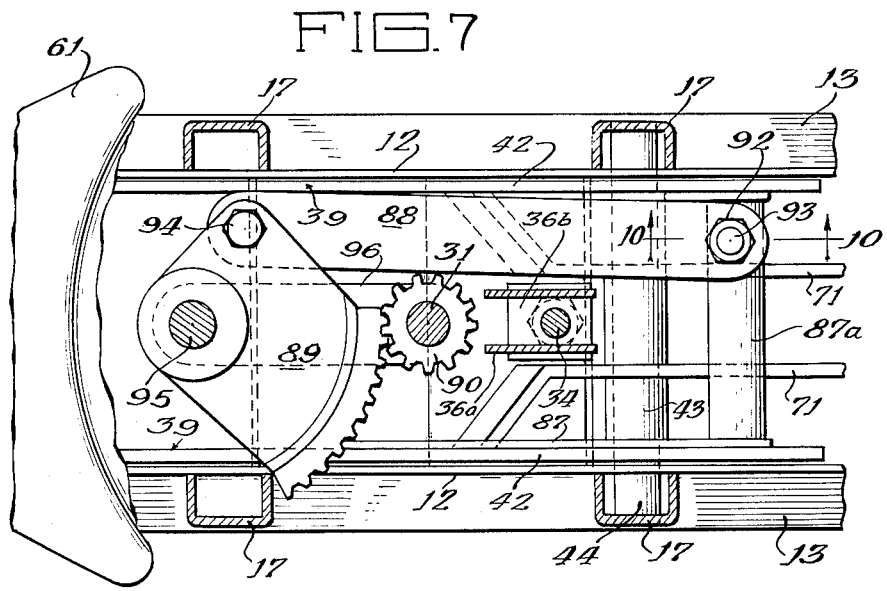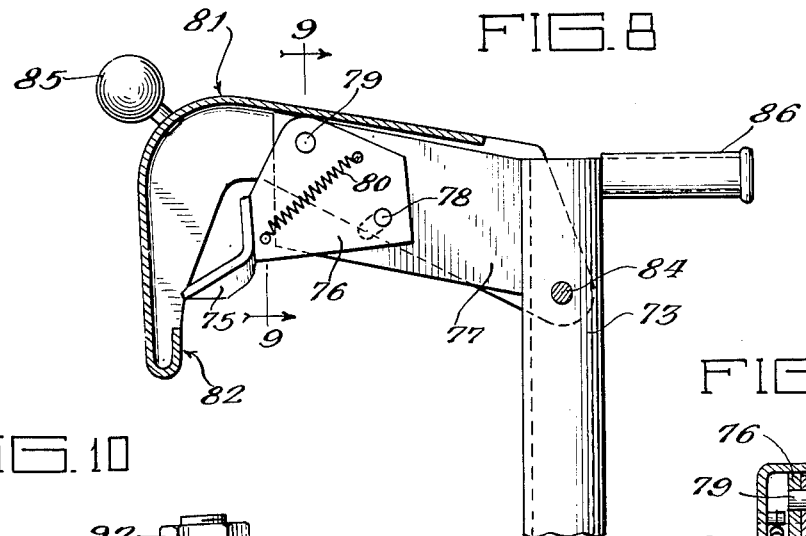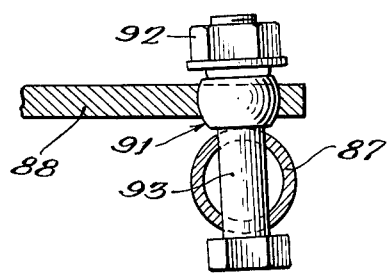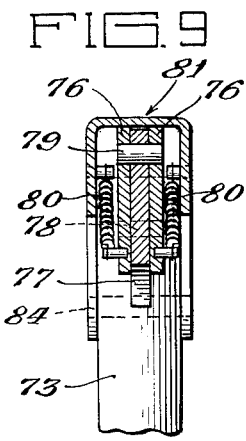

3,255,800
TIRE CHANGING STAND
Elmer J. Strang and Floyd R. Swanson, Jr., Fort Dodge, Iowa, assignors to The Coats Company, Inc., a corporation of Iowa
Filed July 15, 1964, Ser. No. 382,874
13 Claims. (Cl. 157—1.24)

This invention relates to a tire changing stand and more particularly to one which is powered for the purpose of breaking beads of tires loose from wheel rims and also powered for revolving a tool to mount as well as demount a tire from the rim.

The primary object of this invention is to provide a new and improved tire changing stand.

In addition to the foregoing primary object, it is of generally equal importance in the present invention that a device is provided which can accept wheel rims of various diameters with the machine having parts to attack the tire beads for loosening purposes on all such rims in the same manner.

Another object of this invention is to provide a bead breaker for a tire changing stand which will have the same relation to the wheel rim for all sizes of rims and tires.

Another object is to provide such a machine with a novel upper bead breaker automatically operable to bring itself into proper relation to a wheel rim and tire mounted thereon.

A further object is to provide means for limiting the stroke of the machine, preventing over-travel of the bead breaking shoes when operating upon some wheel rims.

A further object is to provide a tire changing stand with a novel table and frame structure which maintains all parts in operable condition over long life and extensive use of the equipment.

Other objects, features and advantages of the present invention will be apparent from the following description of a preferred embodiment illustrated in the accompanying drawings, in which:

FIGURE 1 is a side elevational view of the tire changing stand embodying the present invention showing in dotted outline the tire mounting and demounting tool used with the machine and the peripheral outline of a wheel rim mounted on the stand;

FIGURE 2 is an end elevational view of the machine looking toward the left-hand end of FIGURE 1;

FIGURE 3 is similar to FIGURE 2 looking toward the right-hand end of FIGURE 1 with the upper bead breaker column broken away for clarity of illustration;

FIGURE 4 is a top plan view of the machine shown in FIGURE 1;

FIGURE 5 is a horizontal sectional view through the machine generally below the table and taken substantially along line 5—5 in FIGURE 6;

FIGURE 6 is a sectional view in an upright plane through the machine showing the internal working parts thereof and having the outline of a wheel rim illustrated on the table taken substantially along line 6—6 in FIGURE 4;

FIGURE 7 is a fragmentary horizontal sectional view like FIGURE 5 showing the parts in a different position;

FIGURE 8 is an enlarged side elevational view partially in section of the upper bead breaker assembly;

FIGURE 9 is a vertical sectional view through the assembly of the upper bead breaker taken substantially along line 9—9 in FIGURE 8;

FIGURE 10 is an enlarged sectional view through the connection between the lever and the gear drive mechanism taken substantially along line 10—10 in FIGURE 7; and FIGURE 11 is a diagrammatic sectional view through a wheel rim supporting portion of the table with three different sizes of wheel rim outlines shown in their supported relation on the table.

The frame of the present tire changing stand is constructed to withstand considerable abuse while retaining the relative position of the parts. The frame has a pair of side plates 12, each with an out-turned bottom flange 13 by which the machine may be bolted to the floor of a tire shop or filling station where it is to be used. Suitable cross bracing between the base plates 12 is provided within the machine where it will be out of the way of the internal working parts. Thus, a bottom plate 14 at one end of the machine extends between the plates 12 and is welded thereto to hold the plates in their relative positions. Similarly, a brace 15 at the other end of the machine extends between the plates 12.

The stand is intended to hold a wheel rim and tire generally at table height so that it is convenient for a workman to mount or demount tires from the rim. For this purpose a table generally indicated 16 is mounted upon four upstanding posts 17, each of which is in this instance a channel-shaped member welded along its length to the base plates 12 so as to extend upwardly in generally parallel relation to each other. The table top itself is a relatively heavy metal stamping 20 having a depending skirt 21 extending completely around the periphery of the table so as to extend over the upper ends of the members 17. By welding the table top 20 is secured to the channel irons 17 making a very rigid structure.

The shape of the table top is particularly chosen to accept and hold wheel rims of various sizes in a predetermined position on the machine. For this purpose the table top has a pair of opposed surfaces 22 and 23, each of which is similarly shaped as viewed in FIGURES 4 and 6. The surfaces 22 and 23 are raised from the intermediate portion 24 of the table top and each is somewhat crescent-shaped from side to side and arcuate in vertical section. The arcuate shape may be viewed in FIGURE 6 and is chosen as the arc of a circle about a center point 25 on the machine for the surface 23 and a center point 26 for the surface 22. Each of the surfaces has the same arcuate shape so that a wheel rim mounted on the table will engage the surfaces and be held substantially level with the floor upon which the machine sets.

While it is prefered to stamp the table top out of relatively heavy gauge steel, it may be formed of other metals and by other processes such as casting. By using a stamping of carbon steel, it may easily be welded to the upstanding channels 17 forming a very rigid structure.

A mechanism is used to hold a wheel rim on the machine for tire changing operations. This involves a hollow center post 27 with a threaded section 28 on one side for receiving an internally threaded cone member 29 (FIGURE 2) capable of engaging the center hole in a wheel rim and tightening it against the table surfaces 22 and 23. The hollow shaft 27 is mounted within a metal block 30 welded to the underside of the table member (FIGURE 6). The hollow post receives a shaft 31 with its upper end 32 exposed and of rectangular shape to be received within a slot in the tire tool 33 (FIGURE 1). The tire tool may conveniently be one which has opposite ends respectively for mounting and demounting the tires on the wheel rim such as shown in the application of Strang and Scott, Ser. No. 344,634, filed Feb. 13, 1964. While the center post 27 and cone 29 hold the wheel rim down against the table top, a separate plunger is provided for keeping the wheel rim from turning or rotating about the center post. A metal plunger 34 with a tapered upper end 35 to fit within a lug hole in a wheel rim is pressed upwardly through a slot 36 in the table top by a spring 37 so that the plunger will engage the wheel rim lug opening and the sides of the slot 36 in the table top, the supporting side plates 36a and bottom plate 36b thus preventing the wheel rim from turning as the tire tool is rotated about the rim for mounting and demounting a tire.

Once a wheel rim with a tire thereon is secured to the table, the beads of the tire are loosened from the wheel rim by power operated bead breaking shoes. Considerable force is required and this is provided generally by a piston and cylinder device 38 and a lever 39 carrying a lower bead breaking assembly 40 and operably connectable with an upper bead breaking assembly 41. The upper and lower beads of a tire may be loosened simultaneously at diametrically opposite sides of the wheel rim.

The details of the lever and lower bead breaking shoe are best seen in FIGURES 5 and 6. The lever 39 has a pair of side rails 42 connected by a sleeve 43 which embraces a pivot pin 44 extending through the side base plates 12 and the web of the channel member 17 on the right-hand side of the machine as shown in FIGURE 1. The side plates 42 are joined by a channel 45 directly above the piston and cylinder device 38 so that the side plates actually are part of one rigid lever 39.

The lever is caused to move about its pivot by the extension of the piston rod 46 out of the cylinder 38 so that the upper end of the rod pivoted by a pin 47 to the lever may raise the lever relative to the table top. In the present instance air is admitted through an air line 48 as controlled by a valve 49 to the lower end of the cylinder below a piston 50. The space 51 above the piston is filled with oil or a similar liquid in order to control the speed at which the air pressure moves the piston and rod. The oil may escape above a diaphragm 52 through a metering orifice 53 into an upper space 54 within the cylinder. Air from the upper space 54 is vented through a line 55 controlled at its outer end to atmosphere by a valve 56 (FIGURE 4). So long as the valve 56 is open, the piston 50 can move its entire travel, but closing the valve 56 will trap air above the liquid within the cylinder in space 54 preventing the full travel of the piston. A larger diameter wheel can fit further down on the table top so that it may be desirable not to move the bead breaking shoes as far toward the table. In this instance an operator may merely close the valve 56 thus limiting the extent of the stroke of the lever mechanism.

The lower bead breaking shoe assembly comprises an outer large shoe 57 swingably mounted about a pivot pin 58 on the lever 39 and an inner shoe 60 also pivotally mounted about the same pin 58. The upper shoe has a tire side wall engaging upper surface 61 which will lift the side wall of the tire upwardly as the lever is raised. The lower shoe 60 is much narrower and smaller and is intended to engage the tire adjacent its bead. Referring to FIGURE 6, a wheel rim outline 62 is shown with its periphery 63 resting on the table surface 23. The lower shoe 60 may be adjusted to miss contact with the metal wheel rim but come quite close in order to do an effective job of prying the tire bead loose from the rim. An adjustment of the position of the lower shoe may be easily made since the lower shoe has an extension arm 64 extending downwardly opposite a rigid angle 65 between the side rails of the lever and against which an adjustment screw mechanism 66 is mounted. By changing the adjustment, the position of the shoes relative to the lever may be chosen quite accurately since the surface 23 of the table is arcuate about the point 25 which is the center of rotation of the lever 39.

The importance of the lever, shoe and table arrangement may be more fully understood from the diagrammatic view of FIGURE 11. Herein the table surface 23 is shown as related to three different diameter wheel rims as indicated by the legends thereon. It may be noted that the shape of the wheel rims varies considerably and there are many different widths of rims and shapes of rims used in each of the popular diameters, 13″, 14″ and 15″. The present machine will take smaller and larger wheel rims than those indicated. In each instance, however, the rim sets against the table surface 23 in substantially the same manner so that the shoe 60 will attack the tire on such a wheel rim substantially in an identical fashion regardless of the size of the rim.

After the elevation of the lower bead breaking shoes by the piston and cylinder devices, the air pressure may be cut off from the cylinder and through the same valve 49 the cylinder may be vented to atmosphere so that the parts are in a position to return the shoes to the full line position shown in FIGURE 6. In order to aid the return a plurality of springs 67 is mounted between the base brace 15 and the cross member 65 on the lever 39. A valve mechanism 68 within the piston and cylinder device allows the rapid flow of oil from the upper space 54 to the lower space 51 above the piston facilitating the rapid return. The piston and cylinder device is provided with a sleeve 69 at its lower end embracing a stationary rod 70 fastened to the framework so that the cylinder may turn slightly as it raises the lever.

The upper bead breaker is caused to do its work by the same lever which operates the lower bead breaking shoes. The lever 39 is provided with extension rails 71 extending out rearwardly of the machine in order to support a pin 72 to which the lower end of a column 73 may be fastened by one of a plurality of notches 74 in the lower end of the column. The column carries an upper bead breaking shoe 75 mounted upon a pair of plates 76 embracing a stationary extending arm 77 on the column. A certain amount of movement of the shoe radially of a wheel rim thus inwardly and outwardly relative to the column 73 is provided by a pin and slot connection 78 and a pivot 79, the pivot permitting the movement of the shoe to the extent permitted by the pin and slot arrangement. A pair of springs 80 extending between the shoe and the walls of the overhanging hook-shaped hood 81 tend to pull the shoe toward the column 73.

The hook-shaped member 81 is for the purpose of holding the upper shoe in proper position on a wheel rim as the shoe descends to break loose the bead. The member 81 is a hollow hood-like member with a nose portion 82 intended to engage on the inside of a wheel rim opposite the portion on which the bead of the tire would normally rest. In FIGURE 6 this would be in the area indicated by the reference character 83. The hood embraces the upper shoe supporting mechanism and has a bifurcated rearward portion extending downwardly to a pivot pin 84 securing the member to the column. A handle knob 85 is provided on the outer end so that the member 81 may be placed over a wheel rim in its retaining position. A handle 86 also aids in maneuvering the column.

In operation the upper shoe is caused to assume its proper relation to the wheel rim by the placement of the retaining hood-like member within the wheel rim whereupon the shoe 75 will rest against the tire. As the column 73 is lowered by the lever extension 71, a number of movements occur. First, the pivot pin 84 for the retaining member is sufficiently low on the column that the nose portion 82 will stay in engagement with the wheel rim, there being a downward component of force on the nose portion to hold the nose portion in place. Also, the shoe 75 to the extent allowed by the pin and slot arrangement will move inwardly of the outer extremity of the wheel rim to attack the tire bead adjacent its inner extremity. A positive bead loosening operation will result. On some wheel rims the column may be connected to the lever in one of the lowermost hooks 74 and greater movement of the column may be obtained by successive connections of the lever to the column in different ones of the available hook members.

Once the beads of a tire are loosened from the wheel rim, the next operation involves the removal of the tire by forcing the beads thereof over the extremities of the wheel rim. In drop-center wheel rims one side of the tire bead may be forced into the drop center while prying the opposite side over the wheel rim extremity. In the present machine the piston and cylinder device also is connected to the tire tool driving shaft 31 in a manner to rotate a tool about 270° to 280° which is found sufficient for tire mounting and demounting operations. The mechanism for rotating the shaft involves an extension arm on the lever with side plates 87 connected by a cross member 87a at its outer end in order to support a pull link 88 for turning a gear segment 89 in mesh with the gear 90 secured to the lower end of a shaft 31. The pull link 88 is provided with a commercially available type of universal joint 91 shown in detail in FIGURE 10. Lock nut 92 holds the parts in position so that the bolt 93 through the cross member 87a on the extension arm may pull the link 88 pivoted at 94 to the segment by a similar universal joint. The segment is secured on a stub shaft 95 mounted in the block 30 under the table, a connecting strap 96 between the center shaft and stub shaft insuring parallelism between the shafts during use. The extreme positions of the segment and gear are shown in FIGURES 5 and 7 and as the springs 67 return the lever and shoes to their original positions, the shaft 31 is rotated back to the position of FIGURE 5. The tire tool 33 shown in FIGURE 1 may be placed over the upper drive end of the shaft 31 in positions 180° apart so that the rotation throughout the 360° of a wheel rim is possible.

When mounting tires on a wheel rim the mounting tool may be used on the center shaft and the lower bead breaker will rise as the tool is rotated, but this does not interfere but rather helps the operation of getting the tire beads into the drop center. During such mounting operation the upper bead breaker column and its shoe are simply laid aside and not engaged with the tire. The present machine can operate equally well on much larger wheels which will simply fit further down on the table. In such instances, the operator should close the valve 56 to cushion and limit the stroke of the bead breaking shoes, thus avoiding any damage to the wheel rim.

The foregoing detailed description has been given for clearness of understanding only and no unnecessary limitations should be understood therefrom as some modifications will be obvious to those skilled in the art.

We claim:

1. A tire changing stand capable of receiving and holding wheel rims of different diameters for power bead loosening, comprising:
    a table and supporting frame, said table having a pair of opposite surfaces for engaging opposite internal circumferential portions of a wheel rim placed on the table;
    clamp means for securing a wheel rim against said table surfaces;
    a power actuated lever pivoted in said frame for swinging movement toward and away from the table, said lever carrying a bead breaking shoe positioned to move past one of said table surfaces for forcibly moving a tire bead toward the center of a wheel rim secured on the table;
    said table surface adjacent said shoe being arcuate in section in the direction of shoe movement and of a radius centered substantially on the pivot of said lever so that the shoe may move in constant spaced relation to the table surface whereby the shoe may substantially similarly attack tires on wheel rims of different diameters placed on the table.

2. A tire changing stand as specified in claim 1 wherein the bead breaking shoe is pivotally secured to the lever for movement toward and away from the arcuate table surface, said shoe and lever having adjusting means for moving the shoe to a selected angular position on the lever adjusting the space between the shoe and table surface.

3. A tire changing stand as specified in claim 1 wherein the lever is pivoted to one side of the frame, extends under the table and carries said shoe at the opposite side of the frame, and an extensible power unit mounted under said lever and pivoted to the lever and frame for moving said lever and shoe.

4. A tire changing stand as specified in claim 1 wherein said lever has an extension opposite said shoe and beyond the lever pivot for lowering an upper bead breaker assembly relative to said table, said assembly including an upright arm and extension projecting over the table with an upper shoe thereon in position to engage a tire bead on a rim on said table, and an overlying retaining member pivotally attached to the upright arm and having a body over said upper shoe and a depending nose portion for engaging upon the inner periphery of a wheel rim on the table while said upper shoe attacks said upper tire bead, said nose portion restraining the upper shoe from losing contact with the tire during lowering movement of the arm.

5. A tire changing stand adapted to loosen tire beads on different diameter wheel rims with equal facility comprising:
    a supporting platform for a wheel rim having opposed downwardly sloping and diverging surfaces spaced to engage the interior circumferential periphery of a wheel rim at opposite sides;
    a tire bead loosening shoe mounted in the stand below the platform;
    means for forcing the shoe upwardly past one of the supporting platform surfaces;
    and said shoe having guide means directing movement of said shoe in a path having constant spaced relation to said platform surface whereby the shoe may similarly attack the tire bead on a plurality of wheel rim diameter successively held against said platform surfaces.

6. A tire changing stand for handling a tire and wheel rim assembly, comprising:
    a wheel rim supporting platform having a surface to engage the circumferential extremity of a wheel rim;
    means for securing a wheel rim on said platform with the rim engaging said surface;
    a frame for holding the platform in an elevated position for convenient workman access thereto;
    a lever pivoted in said frame for swinging movement toward and away from the wheel rim supporting platform;
    a bead breaking shoe carried on said lever in a position to move past said platform surface, said platform surface being arcuate about the pivot of said lever in the direction of lever movement so that the shoe may move in constant spaced relation to and past said surface and thus to a wheel rim extremity engaging said surface whereby the shoe may attack a tire casing on wheels of different diameter in substantially similar location relative to the wheel rim.

7. A tire changing stand as specified in claim 6 wherein a pneumatically operated power means is pivoted in said frame for swinging the lever, and means are provided for selectively cushioning the power means and limiting the stroke thereof to limit the distance said bead breaking shoe may move relative to said platform surface.

8. A tire changing stand as specified in claim 6 in which said platform surface has opposed portions similarly arcuate to receive and hold wheel rims of different diameters in generally parallel and relatively lower positions on the platform with increasing diameter rims, and means are provided for limiting upward movement of the bead breaking shoe so as not to move excessively past larger wheel rims on said platform.

9. A tire changing stand as specified in claim 6 in which said wheel rim supporting platform comprises a metal stamping of generally rectangular plan with said surface for engaging the wheel rim at opposite ends of the platform, said frame having upstanding members secured to said stamping at spaced positions and a base member securing said upstanding members together relatively immovably and said lever is pivoted on a cross member secured in said upstanding members and said base member.

10. A tire changing stand for loosening beads from wheel rims of different diameters, comprising:
a frame,
a wheel rim supporting table on the frame and having a supporting surface to engage a wheel rim;
lever means pivoted in the frame for swinging movement toward and away from the table;
power means mounted in the frame and connected to said lever to pivot the lever upon activation;
and an upper bead breaker shoe for engaging the upper bead of a tire on said wheel rim on the table, column means connecting said shoe and said lever;
and a retaining member pivoted to said column and extending inwardly to the wheel rim generally next to the upper bead breaking shoe, said retaining member including a hook-shaped member having an elongated nose portion engageable inside said wheel rim for holding the column against outward movement relative to said wheel rim during bead loosening movement, said pivot to the column being located to provide a downward component of force on said nose portion automatically retaining the same in the wheel rim during bead loosening downward movement of the column, said nose portion extending downwardly inside the wheel rim generally parallel to the column.

11. A tire changing stand as specified in claim 10 wherein the column has a rigid outstanding arm spaced above a wheel rim on the table and the upper bead breaking shoe is supported on said arm, said retaining member being a hook-shaped arm extending over the rigid arm and shoe with the nose portion extending below the shoe to engage within the wheel rim, the pivot of said hook-shaped arm to the column being below the rigid arm to provide said downward component of force on the nose portion.

12. A tire changing stand for handling a tire and wheel rim assembly, comprising:
a wheel rim supporting platform having a surface to engage the wheel rim;
means for securing a wheel rim on said platform with the rim engaging said surface;
a frame for holding the platform in an elevated position for convenient workman access thereto;
a lever pivoted in said frame for swinging movement toward and away from the wheel rim supporting platform;
an upright column connected with said lever and carrying an upper bead breaking shoe in position to engage an upper tire bear on a wheel rim on said platform;
and a retaining member pivoted to the column and extending past said shoe with a downwardly extending elongated nose portion engaging the inside of the wheel rim directly radially opposite of the juncture of the wheel rim and a tire bead and opposite the tire bead loosening shoe for retaining the column and shoe against movement away from the wheel rim upon lowering of the column and shoe relative to a wheel rim.

13. A tire changing stand as specified in claim 12 wherein the nose portion of the retaining member is elongated to engage the wheel rim on a radially aligned portion thereof forming a seat for a tire bead and said pivot to said column is lowered with the column providing a downward component of force on the nose portion retaining the retaining member in engagement with the wheel rim.

References Cited by the Examiner

UNITED STATES PATENTS 3,032,095   5/1962   Brosene et al. _ _ _ _ 157—1.28 X

GRANVILLE Y. CUSTER, JR., *Primary Examiner.*